INVENTOR.
John Cumming

April 7, 1964     J. CUMMING     3,127,902
WATER LEVEL INDICATOR
Filed Feb. 12, 1963     2 Sheets-Sheet 2
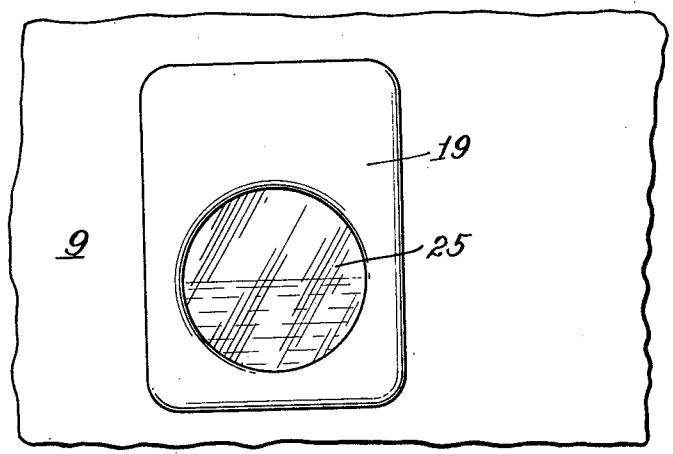
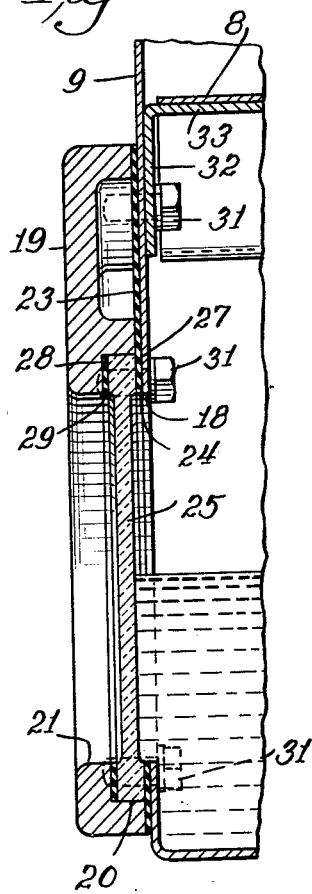
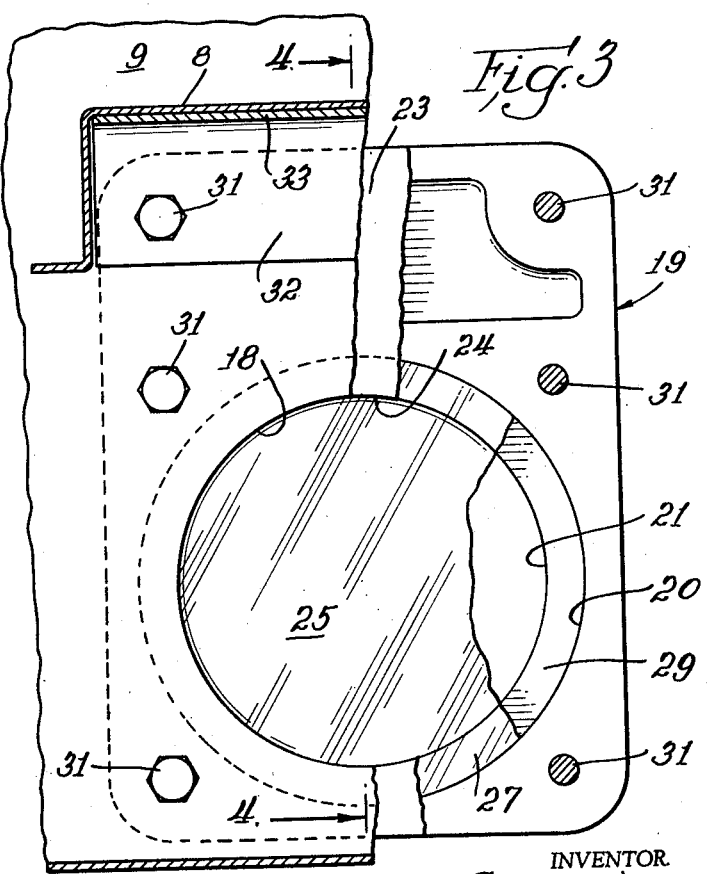
INVENTOR.
John Cumming

United States Patent Office 3,127,902
Patented Apr. 7, 1964

3,127,902
WATER LEVEL INDICATOR
John Cumming, River Forest, Ill., assignor to G. S. Blakeslee & Co., Chicago, Ill., a corporation of Illinois
Filed Feb. 12, 1963, Ser. No. 257,955
1 Claim. (Cl. 134—113)

This invention relates to dish washing machines intended for use in restaurants and similar establishments, and has to do with a water level indicator for such machines.

Dish washing machines having a washing compartment and wash and rinse spray means therein are known. In such known machines as I am familiar with, the washing compartment is provided with two oppositely disposed side doors and with means for simultaneously opening and closing them. It is also known to provide a gauge glass for indicating the level of the water or washing solution in the washing compartment. The gauge glass frequently becomes clogged with food particles, in the use of the machine, and does not indicate accurately the water level in the washing compartment nor whether or not the machine is in operation. That is objectionable in that the proper water level should be maintained in the washing compartment, to assure maximum operating efficiency, and there is risk that the doors may be opened while the spray means is in operation, which is objectionable for obvious reasons.

My invention is directed to water level indicating means which avoids the above noted objections to the gauge glass or indicator presently used. To that end I provide an indicator in the form of a window which permits viewing of the interior of the washing compartment at all times, guarding against opening of the doors when the spray means is in operation. The indicator of my invention comprises a transparent member the inner surface of which is exposed to the sprays and to the washing solution or water within the washing compartment. That assures that the transparent member is maintained free of food particles and other foreign matter so that a clear view of the interior of the washing compartment may be had at all times. The transparent member of the indicator is mounted in a frame secured to a wall of the washing compartment, which frame also serves as a support for part of the lower spray assembly, providing a rigid mounting therefor. Further objects and advantages of my invention will appear from the detail description.

In the drawings:

FIGURE 2 is a fragmentary front view, on an enlarged scale, of the washing compartment of the machine of FIGURE 1;

FIGURE 3 is a sectional view, on an enlarged scale, taken substantially on line 3—3 of FIGURE 1 and partly broken away; and FIGURE 4 is a sectional view taken substantially on line 4—4 of FIGURE 3.

Figure 1:
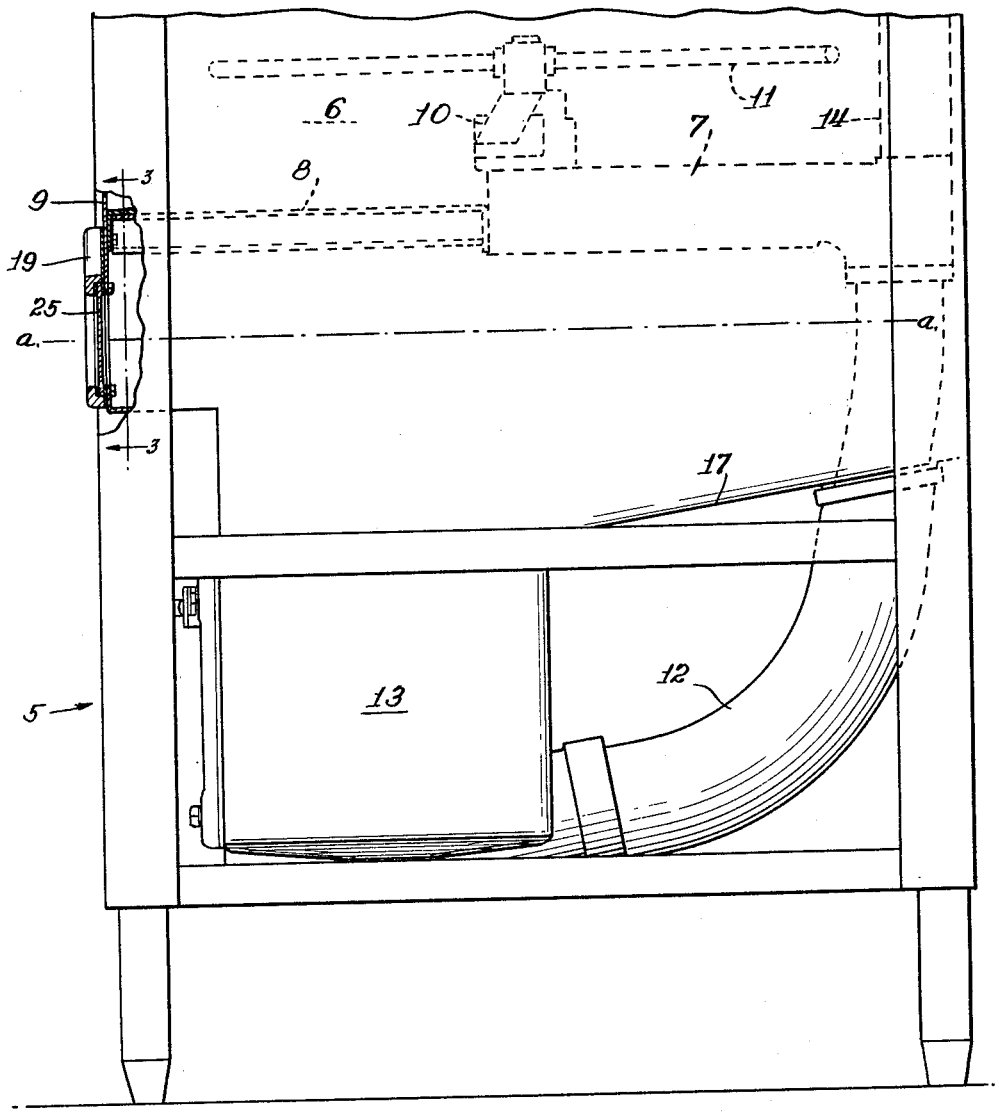
FIGURE 1 is a side view of a dish washing machine embodying the water level indicator of my invention, the upper portion of the machine being broken away and the front wall of the washing compartment being in part broken away with the indicator and adjacent portions of the washing compartment shown in section.

I have illustrated the indicator of my invention as applied, by way of example, to a dish washing machine of known type comprising a housing 5 of substantially rectangular cross section in plan, having at its upper portion a washing compartment 6. The compartment 6 is provided at opposite sides thereof with openings for insertion and removal of trays containing dishes and other articles to be washed, such openings being controlled by vertically slidable doors. The openings and the doors are not shown, as not being necessary to an understanding of my instant invention, and are well known in the dish washing machine field. A manifold 7 is mounted at one end on the rear wall of compartment 6 and extends therefrom inwardly to the center of such compartment. A bracket 8 is suitably secured, conveniently by bolting, to the inner end of manifold 7 and is secured, in a manner to be described more fully presently, at its outer end to front wall 9 of compartment 6. A wash rotor 10 is rotatably mounted on the inner end of manifold 7 and a rinse rotor 11 is also rotatably mounted at the inner end of manifold 7 coaxial with and above the wash rotor 10. A suitable washing solution is delivered under appropriate pressure, through an elbow 12, from a pump 13 to the manifold 7. A conduit 14 delivers washing solution from the manifold 7 to an upper wash rotor (not shown) mounted adjacent the top of the compartment 6. Rinse water is delivered by suitable means (not shown) to the rinse rotor 11 and to upper spray means (not shown) adjacent the top of compartment 6. The pump 13 comprises part of a dish washing machine pump and drain disclosed in the copending application of David G. Blakeslee, Serial No. 251,286, filed January 14, 1963, now Patent No. 3,108,607. While such pump and drain means is preferably used in the dish washing machine embodying my instant invention, that is not essential, and it will be understood that any suitable means may be provided for supplying washing solution to the wash rotor and water to the rinse rotor. The spray arm assembly comprising the manifold 7 and the associated rotors 10 and 11 is similar to the spray arm means disclosed in the copending application of John Cumming and Joseph J. Gaysowski, Jr., Serial No. 254,710 filed January 29, 1963. It will be understood, however, that any suitable means may be provided for projecting washing solution and rinse water onto the dishes and other articles within compartment 6, the particular means used for that purpose not being essential to my instant invention.

The front wall 9 of compartment 6 is provided, at its transverse center and a short distance above its bottom wall 17, with a circular opening 18. A substantially rectangular frame 19, preferably a brass casting, is mounted on the outer face of front wall 9 of compartment 6 in overlying relation to opening 18 in wall 9. The frame 19 is provided in its inner face with a cylindrical recess 20 of somewhat greater diameter than the coaxial circular opening 21 extending from recess 20 through the outer face of frame 19.

A sealing gasket 23, corresponding in outline to frame 19, is interposed between the latter and the front wall 9 of compartment 6. The gasket 23 is provided with a circular opening 24 which registers with opening 18 in wall 9. A glass disc or lens 25 fits snugly in recess 20. The body of disc 25 is reduced in thickness from each side thereof to provide inner and outer flat peripheral shoulders 27 and 28, respectively, the thinned body portion of disc 25 being coaxial with and of the same diameter as opening 21 and the openings 18 and 24 in wall 9 and gasket 23, respectively. The outer shoulder 28 of the glass disc 25 seats on the inner face of an annular gasket 29 of the same width as shoulder 28, the gasket 29 also being of the same width as the shoulder of frame 19 between the opening 21 and the recess 20 thereof. The inner shoulder 27 or the glass disc 25 seats upon the corresponding portion of gasket 23 which, in turn, seats upon the outer face of front wall 9 of compartment 6. The disc or lens 25 preferably is of glass but may be of any suitable transparent material.

The frame 19 is secured to wall 9 by machine screws 31 passing through that wall and gasket 23 and threading into frame 19, lock washers being interposed between the heads of the screws and the inner face of wall 9, as will be understood. The two upper screws 31 also pass through the downwardly extending finger 32 of an angle bracket 33 suitably secured, conveniently by welding, in the outer end of bracket 8 and seating against the inner face of wall 9. The frame 19 thus provides a rigid mounting member for the outer end of bracket 8 effective for preventing objectionable vibration of bracket 8 and manifold 7, which might occur if wall 9 were not stiffened by the frame 19. The gaskets 23 and 29 are placed under compression incident to forcing of frame 19 toward wall 9 by the screws 31, as will be understood, providing a liquid tight seal between frame 19 and wall 9 and also providing liquid tight seals between the glass disc 25 and wall 9 and frame 19. The glass disc 25 is positioned with its axis at or about the normal water level in the washing compartment 6, indicated by the broken line $a$—$a$ on FIGURE 1. During the washing operation the washing solution within the compartment 6 is agitated by the sprays projected from the lower rotor 10 and from the upper rotor (not shown) previously mentioned and is also impinged upon by sprays deflected from the dishes being washed as well as sprays from the upper rotor. The net effect is that the inner face of the glass disc is continuously subjected to a washing operation which effectively prevents accumulation of food particles or other foreign substances thereon, leaving the glass disc 25 unobstructed. That assures that the interior of the washing compartment 6 may be clearly viewed at all times to determine whether or not a washing operation is being performed, thereby guarding against opening of the doors during such operation, while also rendering it possible to observe the height of the washing solution within compartment 10 so as to determine whether or not replenishment thereof is required. Likewise, during the rinsing operation the inner face of the glass disc 25 is maintained in a clean condition, with the advantages noted in respect to the washing operation. In that connection, upon completion of a washing operation the supply of washing solution to the wash spray means is cut off and rinse water under appropriate pressure is then supplied to the rinse spray means, as is known.

In commercial dishwashing machines, in which known detergents are commonly used, the consumption of detergent and the cost thereof is an important factor. Also, many of the known detergents cause foaming of the washing solution. It is important that foaming be kept at a minimum, to avoid the introduction of air bubbles into the pump and spray systems, which would drastically reduce the efficiency of the machine. Some of the known detergents also impart a definite color to the washing solution. The amount of foaming gives a general indication of the amount of detergent being used, as does the extent of coloring of the washing solution. As above noted the center of the disc or lens 25 is at the normal water level of the machine. The washing solution may readily be observed both as to extent of foaming and color. That enables regulation of the amount of detergent supplied to the machine, so as to avoid objectionable foaming and waste of detergent, both of practical importance for the reasons above stated.

It will be understood that changes in detail may be resorted to without departing from the field and scope of my invention, and I intend to include all such variations, as fall within the scope of the appended claim, in this application in which the preferred form only of my invention has been disclosed.

I claim:

In water level viewing means for dish washing machines, a dish washing machine having a washing compartment substantially rectangular in plan, a substantially horizontal washing solution manifold mounted at one end on one wall of said compartment above the bottom thereof and extending from said one wall toward the opposite wall to approximately the center of said compartment, means comprising a pump connected to said manifold for supplying thereto washing solution under pressure, spray means mounted on the inner end of said manifold for rotation about a substantially vertical axis and overlying said manifold, said compartment having in the operation of said machine a predetermined normal water level adjacent and underlying said manifold, said opposite wall having therein an opening extending above and below said water level, a transparent closure member mounted over said opening with its center disposed substantially at said normal water level and its inner surface exposed to the interior of said compartment, means mounting said closure member on the outer face of said opposite wall, said mounting means comprising a rigid frame overlying said closure member and having an opening exposing the latter, said frame extending a material distance above said opening therein, means adjacent said opening in said frame securing the latter to said opposite wall, mounting bracket means having an inner end secured to said inner end of said manifold and an outer end seating on the inner face of said opposite wall above said opening therein, and means securing said outer end of said bracket means to said opposite wall and said frame above said opening in the latter.

References Cited in the file of this patent

UNITED STATES PATENTS

| | | |
|---|---|---|
| 1,295,232 | Stewart | Feb. 25, 1919 |
| 1,417,162 | Gagen | May 23, 1922 |
| 1,475,489 | Hicks | Nov. 27, 1923 |
| 2,613,837 | Morton | Oct. 12, 1952 |
| 2,619,435 | Flinchbaugh | Nov. 25, 1952 |
| 2,677,382 | Cushing | May 4, 1954 |
| 2,771,892 | St. Palley | Nov. 27, 1956 |
| 2,808,842 | Pollock et al. | Oct. 8, 1957 |
| 3,108,607 | Blakeslee | Oct. 29, 1963 |

FOREIGN PATENTS

| | | |
|---|---|---|
| 234,455 | Great Britain | Nov. 5, 1925 |